June 7, 1927.

H. W. ALDEN ET AL 1,631,448

BRAKE FOR AUTOMOBILES

Filed July 31, 1924

INVENTORS
Herbert W. Alden and George Hufford,
by Carr & Carr,
Their ATTORNEYS.

June 7, 1927.
H. W. ALDEN ET AL
1,631,448
BRAKE FOR AUTOMOBILES
Filed July 31, 1924
2 Sheets-Sheet 2
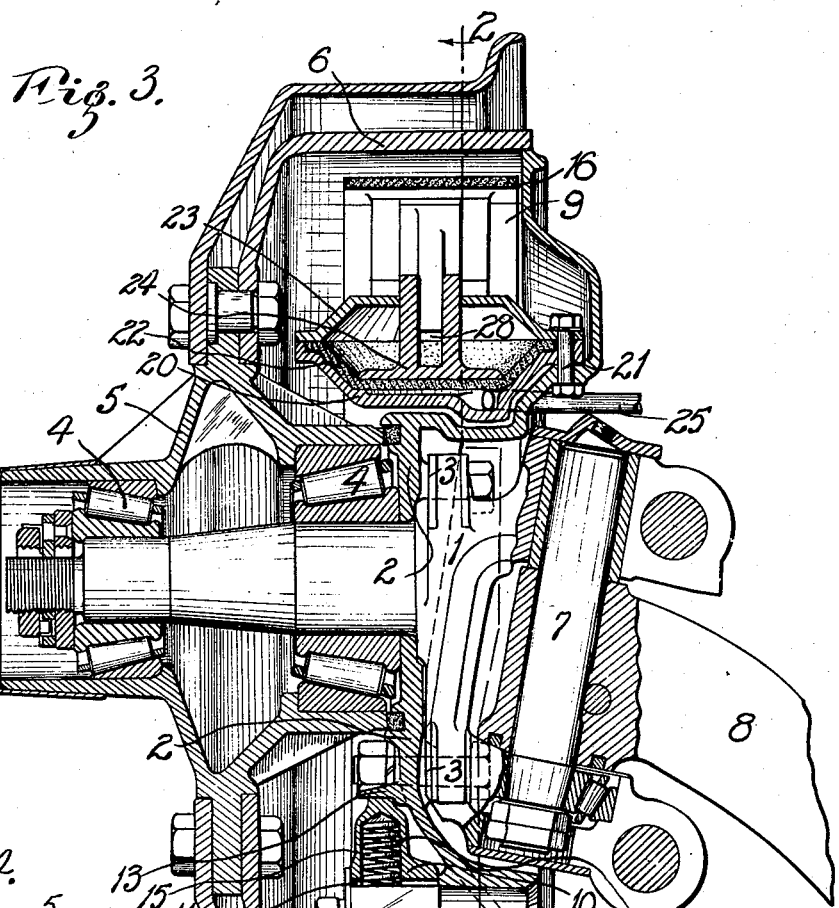
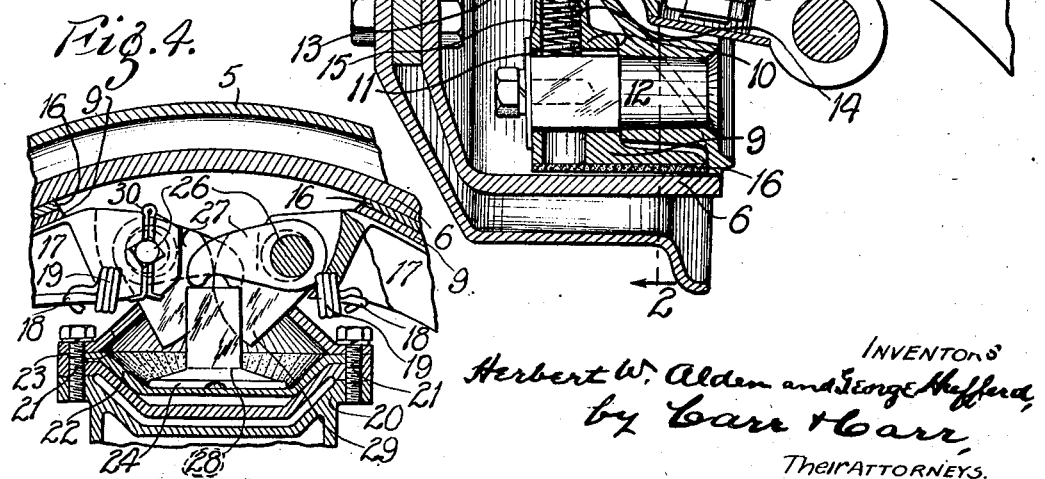
INVENTORS
Herbert W. Alden and George Hefferd,
by Carr & Carr,
Their ATTORNEYS.

Patented June 7, 1927.

1,631,448

UNITED STATES PATENT OFFICE.

HERBERT W. ALDEN AND GEORGE HUFFERD, OF DETROIT, MICHIGAN, ASSIGNORS TO THE TIMKEN-DETROIT AXLE COMPANY, OF DETROIT, MICHIGAN, A CORPORATION OF MICHIGAN.

BRAKE FOR AUTOMOBILES.

Application filed July 31, 1924. Serial No. 729,298.

Our invention relates to brakes, particularly to air or other fluid pressure brakes intended for use on the front or rear wheels of automobiles and it has for its principal objects to produce a brake that is simple, compact and easily operated and is not likely to get out of repair.

The invention consists in the brake and in the parts and combinations of parts hereinafter described and claimed.

In the accompanying drawings which form part of this specification and wherein like reference numerals refer to like parts wherever they occur.

Fig. 3 is a vertical sectional view, and Fig. 4 is a fragmentary view similar to Fig. 2 showing the brake operating mechanism in moved position.

Figure 1:
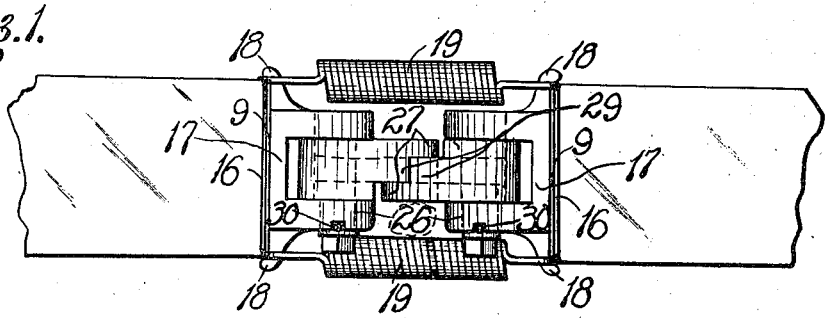
Fig. 1 is a top plan view of a brake construction embodying my invention.
Figure 2:
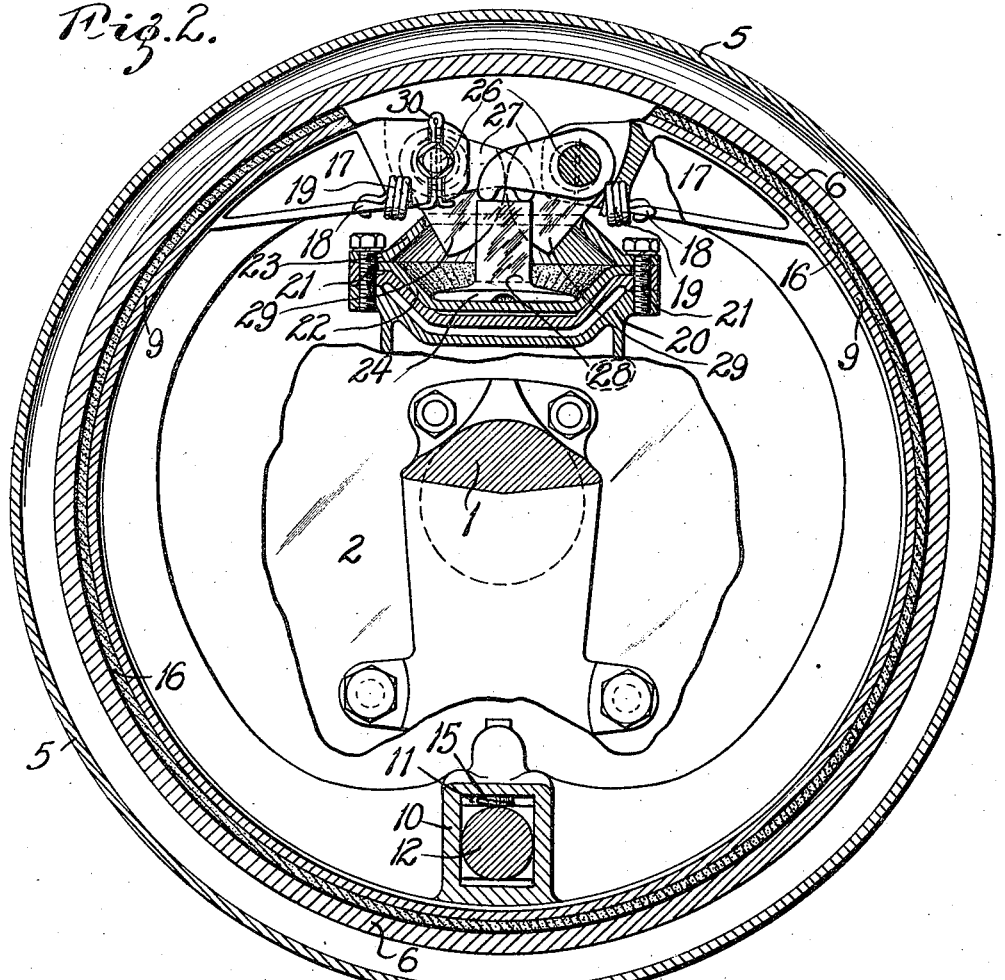
Fig. 2 is an elevation, certain parts being shown in vertical section on a line 2—2 of Fig. 3.

Mounted on the axle spindle 1 is an annular member 2 that abuts against a shoulder 3 on said spindle, said member constituting the brake support. In the embodiment shown in the drawings, a front axle spindle 1 is shown. Mounted on said spindle 1 are suitable roller bearings 4 that support a wheel hub member 5 to which member is secured a brake drum 6. The spindle 1 is secured by means of a steering knuckle 7 to the main axle 8.

A brake band 9 is secured to a fitting 10 at a point opposite the space between the free ends of said band. Said fitting 10 is provided with a hole 11 therethrough in which hole is disposed the end of a rod 12 that is of smaller section than said hole. Said rod is secured to the brake support 2. The top of the fitting 10 rests against a lug 13 that projects from the brake support 2. The fitting 10 is provided with a recess 14 in which is disposed a spring 15 that bears on the upper edge of said rod 12. Thus the spring 15 tends to force said fitting 10 upwardly against said lug 13, thus retracting the brake band 9 from the brake drum 6. The brake band 9 is provided with a suitable brake lining 16.

The free ends of the brake band are provided with fittings 17 on which are ears 18 to which are secured springs 19 that tend to draw the free ends of the brake band together, thus retracting the brake band from the brake drum.

Preferably the brake is operated by air pressure, and a suitable air chamber may be provided by means of a hollow member 20 secured to the brake support 2 as by bolts 21. Said hollow member 20 is provided with a diaphragm 22 and with a cover plate 23. Resting on said diaphragm is an operating block 24 that extends upward through said cover plate 23. An air supply pipe 25 opens into the air chamber.

Pivotally secured to each fitting 17, as by means of a pin 26, is a lever of the bell crank type. One arm of said lever has its end rounded and resting on the operating block 24. Said block 24 is provided with a longitudinal slot 28 in which are disposed cam arms 29 that are integral with or secured to the respective lever arms 27. The curved cam surfaces of said cam arms contact with each other at a point below the line that extends through the centers of the mounting pins 26. The radius of curvature of each cam surface increases downwardly. When the operating block is forced upwardly, it moves the ends of the lever arms 27 upwardly with it, thereby rocking or swinging said arms on the pins 26. This rocking or swinging of the lever arms 27 rocks or swings the cam arms 29 upwardly also, thus continuously shifting their point of contact to points further and further from their pivots, thereby forcing the pivots further apart and spreading the free ends of the brake band and forcing the brake band against the brake drum.

The mounting pins 26 are eccentrically disposed, and are secured in position by means of cotter pins 30 extending through holes therethrough. By removing the cotter pins and rotating the mounting pins 180 degrees, the cam arms 29 may be adjusted by the amount of eccentricity of said pins.

The operation of the brake is as follows:

When air is admitted into the air chamber, it forces the diaphragm 22 and the operating block 24 upward. The operating block raises the lever arms 27, and the cam arms 29 spread the brake band 9 against the brake drum 6, overcoming the pressure of the springs 19 that connect the free ends of the brake band and of the spring 15 in the brake fitting 10. When the air pressure is released, the springs retract the brake band from the brake drum.

The herein described brake has numerous advantages. It is simple and easy to operate, and there are few parts to break or get out of repair. Obviously, the operating block may be moved by a lever or by other fluid pressure than air pressure; brake shoes or other suitable brake means may be substituted for the brake band shown in the drawings; and numerous other changes may be made without departing from the invention; and we do not wish to be limited to the precise construction shown.

What we claim is:

1. A brake for automobiles comprising brake means having spaced ends, levers of the bell crank type pivotally secured on the ends of said brake means and each having one end formed into a cam surface which works against the cam surface of the other lever.

2. A brake for automobiles comprising brake means having spaced ends, levers of the bell crank type pivotally secured on the ends of said brake means and each having one end formed into a cam surface which works against the cam surface of the other lever, and fluid pressure operated means for operating said levers.

3. A brake for automobiles comprising a brake band having free ends, fittings at the ends of said brake band, levers of the bell crank type pivotally mounted on said fittings, and each having one end formed into a cam surface which works against the cam surface of the other lever, and springs secured to said fittings to pull the ends of said brake band toward each other.

4. A brake for automobiles comprising a brake band and having free ends, fittings at the ends of said brake band, levers of the bell crank type pivotally mounted on said fittings and each having one end formed into a cam surface which works against the cam surface of the other lever, and means for operating said levers, whereby said cam arms spread the ends of said brake band.

5. A brake for automobiles comprising a brake band having free ends, bell crank levers pivotally mounted at said ends, an end of each lever being formed into a cam surface and the cam surfaces of the two levers working against each other, and an operating block for operating said levers, said operating block being provided with a slot in which said cam arms are disposed.

6. A brake for automobiles comprising a brake band having free ends, bell crank levers pivotally mounted at said ends, and each having one end formed into a cam surface that works against the cam surface of the other lever, an operating block for operating against the other ends of said levers, said operating block being provided with a slot in which said cam arms are disposed, and fluid pressure operated means for actuating said operating block.

7. A brake for automobiles comprising a brake band having free ends, fittings at the ends of said brake band, eccentrically disposed pins mounted in said fittings, bell crank levers pivotally mounted on said pins and each having one end formed into a cam surface, the cam surfaces of the two cam arms working against each other whereby said cam arms spread the ends of said brake band, an operating block engaging the other ends of said levers, and means for raising said block to swing said levers.

8. A brake for automobiles comprising a brake band having free ends, fittings at the ends of said brake band, levers pivotally mounted on said fittings and each comprising a lever arm and a cam arm, the cam surfaces of the two cam arms working against each other, whereby said cam arms spread the ends of said brake band, an operating block engaging the ends of said lever arms, and means for raising said block to swing said levers, said means comprising a fluid chamber, a diaphragm therefor on which said operating block rests, and means for supplying fluid under pressure to said chamber.

Signed at Detroit, Michigan, this 25th day of July, 1924.

HERBERT W. ALDEN.
GEORGE HUFFERD.